Dec. 17, 1929.  T. PAGE  1,740,261
PAPER ROPE CARRIER
Filed Feb. 25, 1929    2 Sheets-Sheet 1

Inventor
Thomas Page
By Samuel Weisman
Attorney

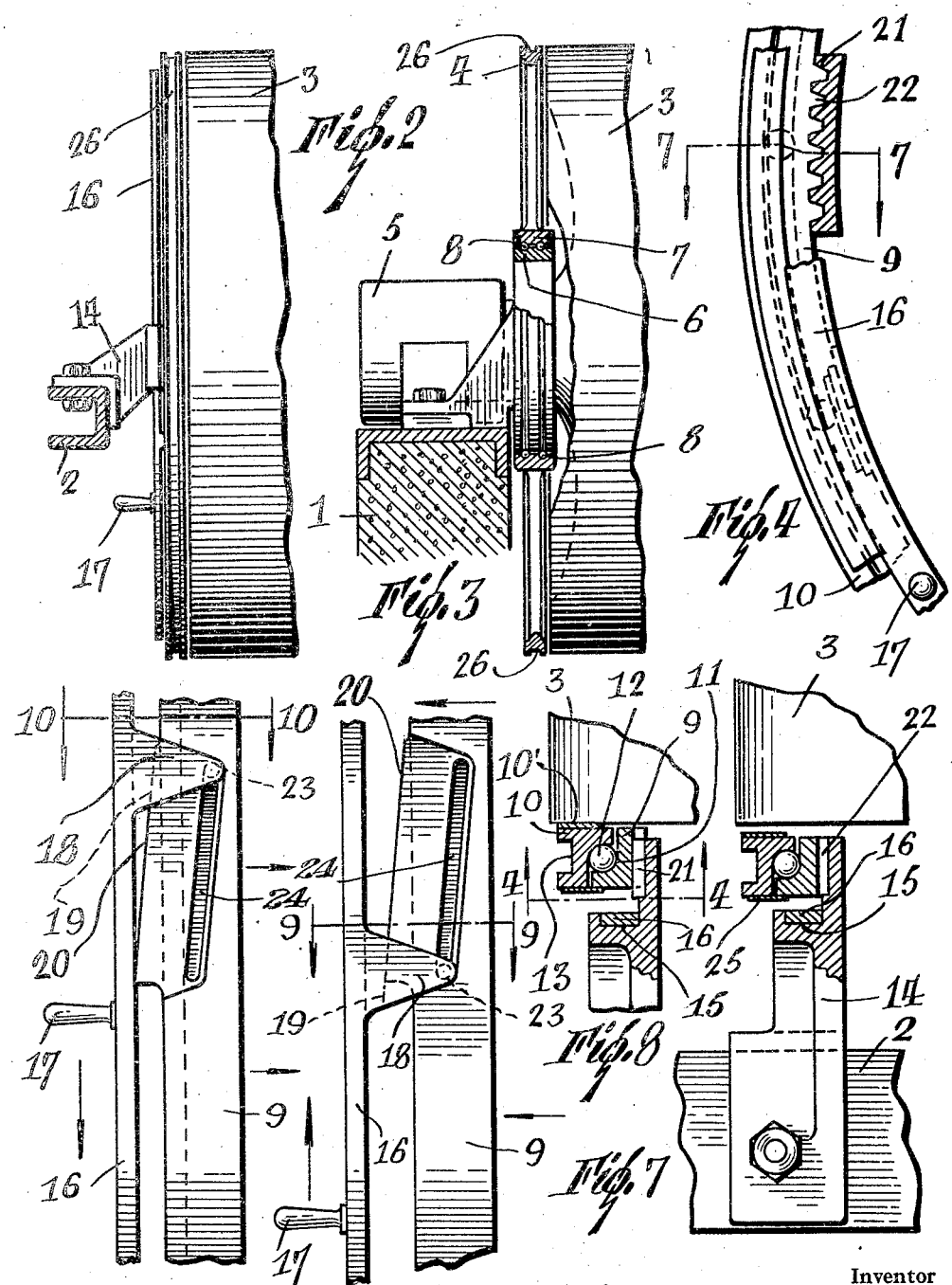

Patented Dec. 17, 1929

1,740,261

UNITED STATES PATENT OFFICE

THOMAS PAGE, OF SHAWINIGAN FALLS, QUEBEC, CANADA

PAPER ROPE CARRIER

Application filed February 25, 1929. Serial No. 342,351.

The present invention pertains to a novel rope carrier for a paper making machine, wherein a rope is moved along with the drier rollers. The rope is intended to keep the sheet of paper in motion even though it should break transversely, and ordinarily moves continuously with the drier rollers.

The present invention provides a carrier which does not move constantly with the rollers but only when its service is required and therefore lying idle at other times. Consequently, there is only a fraction of the ordinary wear on the rope, the life of which is thereby considerably prolonged.

Furthermore, when the rope carrier is permanently geared to the drier rollers, the machine must be shut down in order to replace a rope. In the present instance, the carrier is independent of the rollers, and the rope may therefore be changed without interrupting the operation of the machine.

The invention further provides means for bringing the rope carrier into driving relation with one of the rollers and releasing it therefrom at will.

The invention is fully disclosed by way of example in the following description and in the accompanying drawings in which Figure 1 is a fragmentary end view of a paper making machine equipped according to the invention;

Figure 2 is a fragmentary elevation at an end of one of the rollers, showing the frame in section;

Figure 3 is a similar view of one of the other rollers;

Figure 4 is a cross section of one of the brackets and showing the drive ring in elevation;

Figures 5 and 6 are enlarged details of Figure 2, showing two positions of the operating ring;

Figure 7 is a section on the line 7—7 of Figure 4;

Figure 8 is a similar section showing the drive ring in active position;

Reference to these views will now be made by use of like characters which will be employed to designate corresponding parts throughout.

Figures 9, 10:
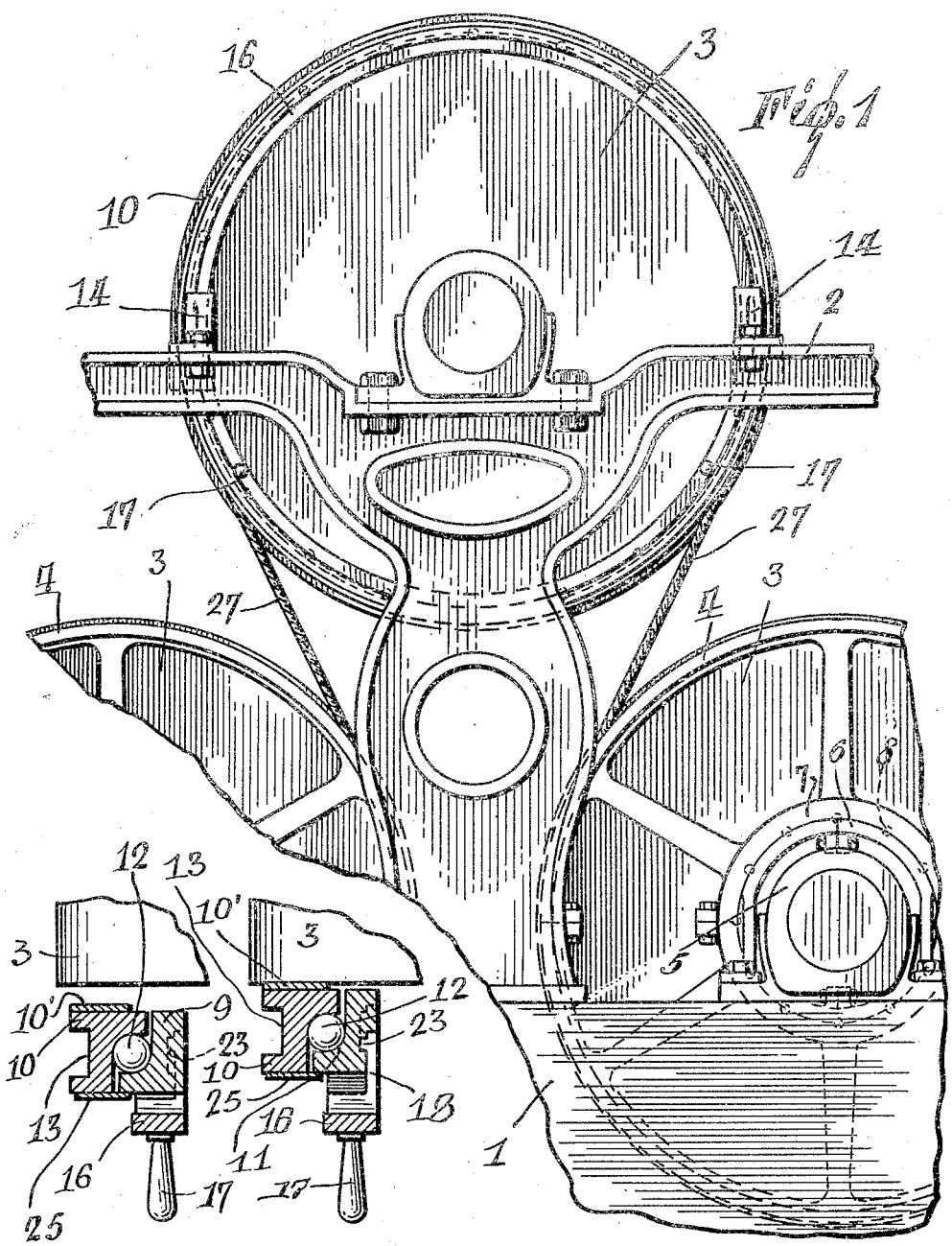
Figure 9 is a section on the line 9—9 of Figure 5.
Figure 10 is a section on the line 10—10 of Figure 6.

In Figure 1 is illustrated a portion of a paper making machine including a base 1 and a frame side member 2. On the base and in the frame are journalled drier rollers 3 of the usual type and in the customary staggered relation.

Spoked carrier rings 4 for the paper carrying rope are mounted adjacent one end of each of the lower rollers 3 and are supported from the bearings 5 of such rollers. The bearing is formed with a grooved race member 6 surrounded by the internally grooved hub 7 of the ring 4. Ball bearings 8 are interposed between the race member and the hub as clearly shown in Figure 3.

The ring adjacent the upper roller is the driving member and is of a two-part character including inner and outer rings 9 and 10 respectively of angle cross section and concaved at 11 in the angle thereof to provide a race for interposed ball bearings 12. The outer ring is formed in its outer periphery with a groove 13 for receiving the rope as will presently appear. The face of this ring adjacent the end of the corresponding upper roller carries a flat band 10' of friction material adapted to engage said end, upon actuation of the ring presently to be described, in order to establish a driving connection between the roller and the ring.

The means for shifting the two-part ring includes brackets 14 secured to the frame 2 adjacent the upper roller and grooved as at 15 to support an operating ring 16 in a rotatable manner. This ring has two handles 17 by one or both of which it may be turned. It will be seen by reference to Figures 9 and 10 that the operating ring 16 lies adjacent the inner ring 9. The operating ring carries a bracket 18 extending into the inner ring 9, and on the inner or under face of the bracket is formed an inclined cam face 19. The adjacent edge of the ring 9 is formed with a similar co-operating cam face 20, so that when the cam 19 is caused to pass the cam 20 by manual adjustment of the operating ring 16, in the direction of the downwardly pointing arrow in Figure 6, the ring 9 is moved towards the end of the adjacent roller, carrying with it the outer ring 10 and bringing the latter into frictional driving relation with the roller. The sliding support for the ring 9 is provided by grooves 21 formed in the brackets 14 parallel to the axes of the rollers 3 and entered by ribs 22 extending from ring.

The driving ring 10 is retracted from the adjacent roller by a pin 23 carried by the end of the bracket 18 and extending into a groove 24 formed in the inner circumference of the inner ring 9. This groove is inclined and parallel to the cam face 20, so that when the operating ring 16 is turned in the direction of the upwardly pointed arrow in Figure 5, the ring 9 is obviously pulled away from the adjacent roller. The outer ring 10 has a band 25 secured to its outer face, opposite the friction band 10', and overlapping the ring 9, whereby the ring 10 is withdrawn simultaneously with the ring 9.

Each ring 4 has a groove 26 in line with the groove 13 of the ring 10 in order to accommodate the paper rope 27. It will now be apparent that the carrier rings and rope are not in constant operation with the drier rollers, as in ordinary constructions, but are brought into operation only when wanted, by means of the operating ring 16, with the results that wear of the rings and rope are considerably reduced and the rope or other parts may be replaced or repaired without the necessity of shutting down the entire machine, as already indicated.

Although a specific embodiment of the invention has been illustrated and described, it will be understood that various alterations in the details of construction may be made without departing from the spirit of the invention as indicated by the appended claims.

Having thus fully disclosed my invention, what I claim and desire to secure by Letters Patent is:—

1. In combination with the drier rollers of a paper making machine, rings mounted at one end thereof and independently therefrom, a paper carrying rope trained over said rings, and means for bringing one of said rings into frictional engagement with the adjacent roller.

2. In combination with the drier rollers of a paper making machine, rings mounted at one end thereof and independently therefrom, a paper carrying rope trained over said rings, an operating ring rotatably mounted adjacent one of said rings and held against axial displacement, and co-operating cams carried by said operating ring and the adjacent ring and adapted to move the latter ring into frictional engagement with the adjacent roller.

3. In combination with the drier rollers of a paper making machine, rings mounted at one end thereof and independently therefrom, a paper carrying rope trained over said rings, an operating ring rotatably mounted adjacent one of said rings and held against axial displacement, and co-operating cams carried by said operating ring and the adjacent ring and adapted to move the latter ring into frictional engagement with the adjacent roller, an inclined groove formed in the periphery of the last named ring, and a pin extending from said operating ring into said groove for retracting the grooved ring from the roller.

4. In combination with the drier rollers of a paper making machine, a two-part ring mounted adjacent an end of one of said rollers, ball bearings between said parts, other rings adjacent one end of each of the remaining rollers, a paper carrying rope trained over said rings, and means for moving one of the parts of the two-part ring into frictional engagement with the adjacent roller.

5. In combination with the drier rollers of a paper making machine, a two-part ring mounted adjacent an end of one of said rollers, ball bearings between said parts, other rings adjacent one end of each of the remaining rollers, a paper carrying rope trained over said rings, fixed brackets adjacent said two-part ring, an operating ring rotatably supported by said brackets, and co-operating cams carried by said operating ring and one of said parts and adapted to move said part into frictional engagement with the adjacent roller.

6. In combination with the drier rollers of a paper making machine, a two-part ring mounted adjacent an end of one of said rollers, ball bearings between said parts, other rings adjacent one end of each of the remaining rollers, a paper carrying rope trained over said rings, fixed brackets adjacent said two-part ring, an operating ring rotatably supported by said brackets, co-operating cams carried by said operating ring and one of said parts and adapted to move said part into frictional engagement with the adjacent roller, a groove formed in one of the parts of the two-part ring, and a pin extending from said operating ring into said groove and adapted to retract said two-part ring from the adjacent roller.

7. The combination described in claim 5, further characterized by grooves formed in said brackets longitudinally of the adjacent roller, and ribs on said two-part ring slidable in said grooves.

8. In combination with the drier rollers of a paper making machine, a two-part ring mounted adjacent an end of one of said rollers, ball bearings between said parts, friction material carried by one of said parts and adapted to engage the end of the adjacent roller, other rings adjacent one end of each of the remaining rollers, a paper carrying rope trained over said rings, and means for moving said part of the two-part ring into engagement with the adjacent roller.

9. In combination with the drier rollers of a paper making machine, a two-part ring mounted adjacent an end of one of said rollers, ball bearings between said parts, other rings adjacent one end of each of the remaining rollers, a paper carrying rope trained over said rings, means for moving one of the parts of the two-part ring into frictional engagement with the adjacent roller, and a band carried by said part at the outer face thereof and overlapping the remaining part.

10. In combination with the drier rollers of a paper making machine, a two-part ring mounted adjacent an end of one of said rollers, ball bearings between said parts, friction material carried by one of said parts and adapted to engage the end of the adjacent roller, other rings adjacent one end of each of the remaining rollers, a paper carrying rope trained over said rings, means for moving said part of the two-part ring into engagement with the adjacent roller, and a band carried by said part at the outer face thereof and overlapping the remaining part.

In witness whereof I have hereunto set my hand.

THOMAS PAGE.